Aug. 12, 1969     N. LAING     3,460,647
AIR-CUSHION VEHICLE
Original Filed Aug. 21, 1961     5 Sheets-Sheet 1
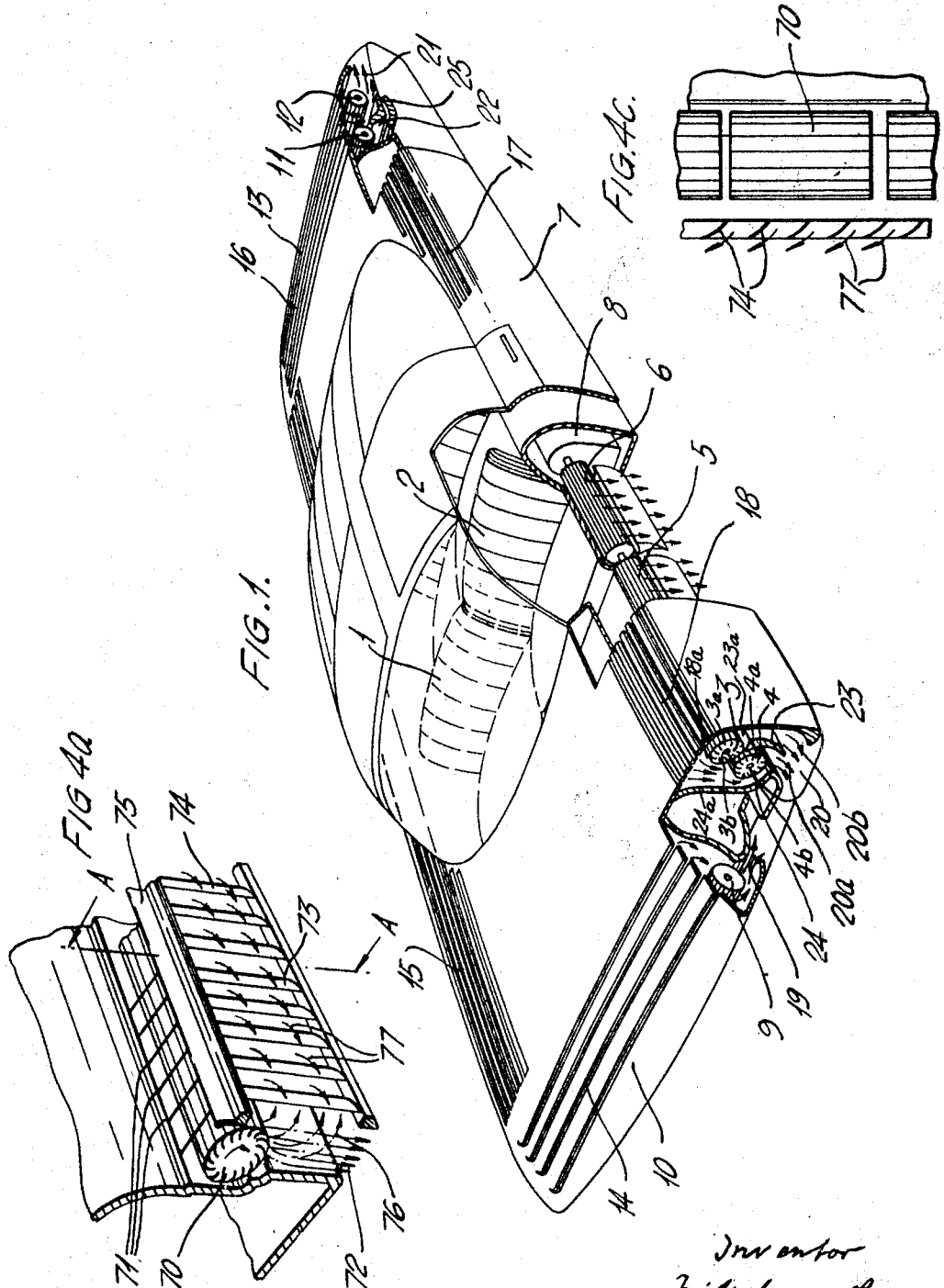
Inventor
Nikolaus Laing
by Michael S. Striker
Attorney

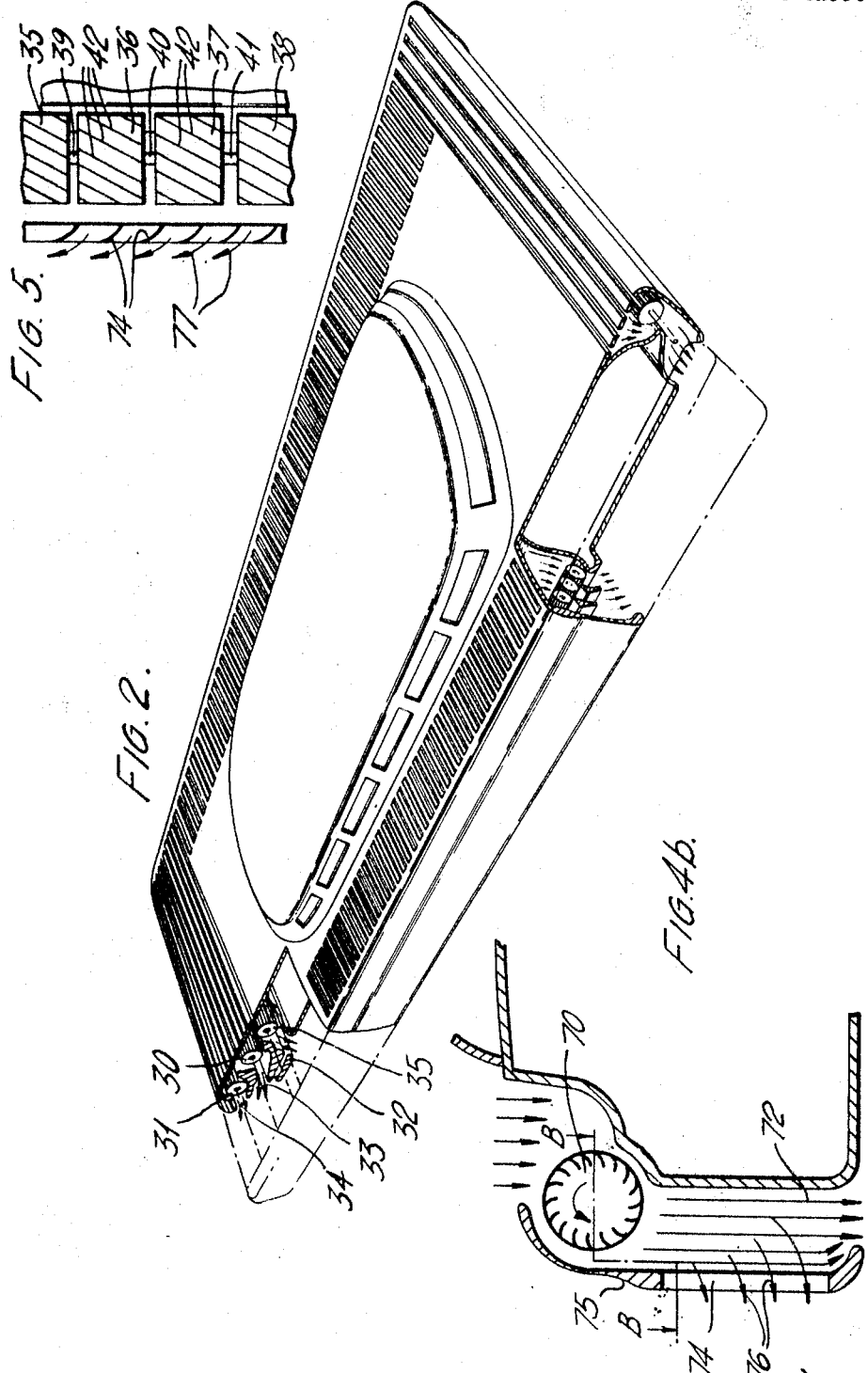

Aug. 12, 1969  N. LAING  3,460,647
AIR-CUSHION VEHICLE
Original Filed Aug. 21, 1961  5 Sheets-Sheet 3
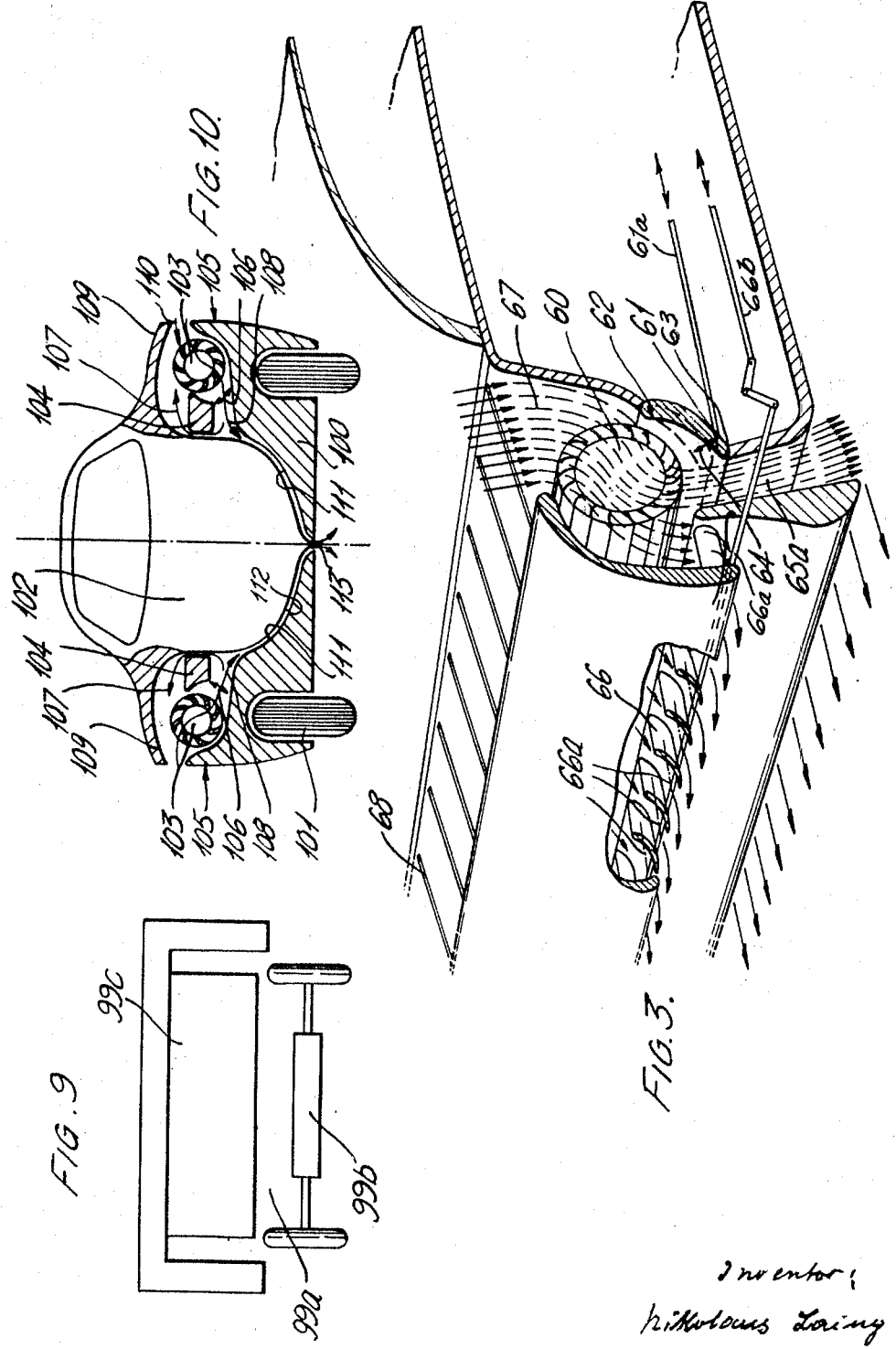

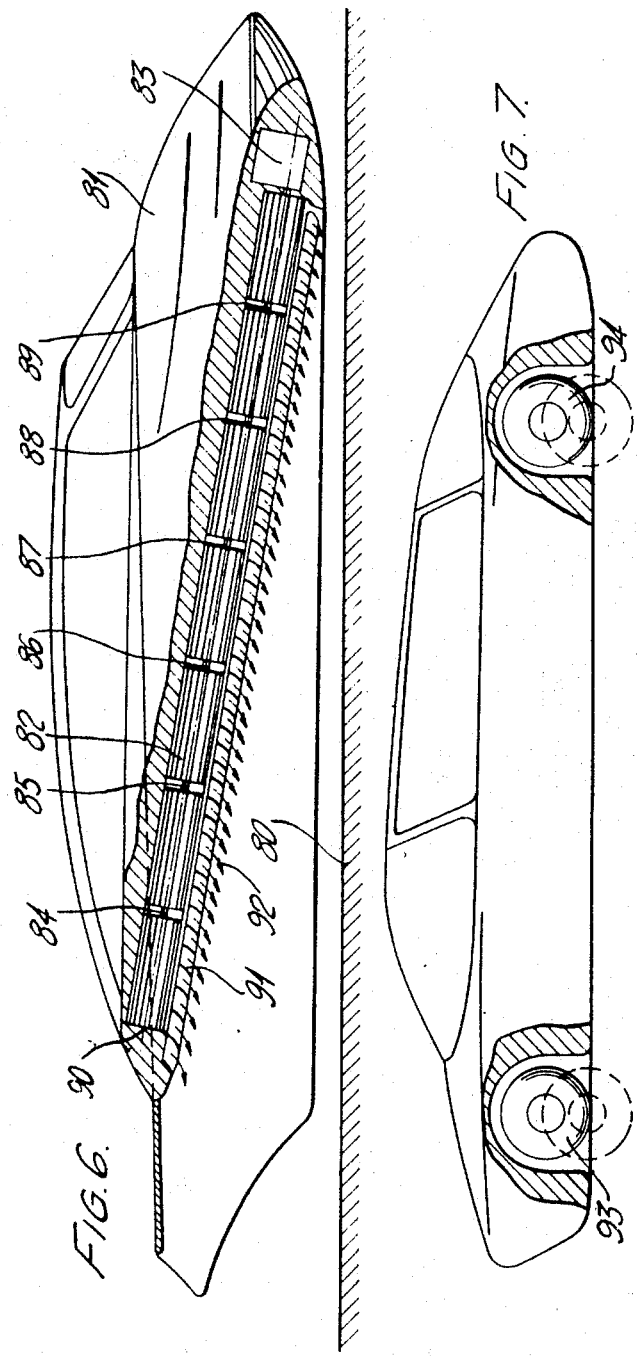

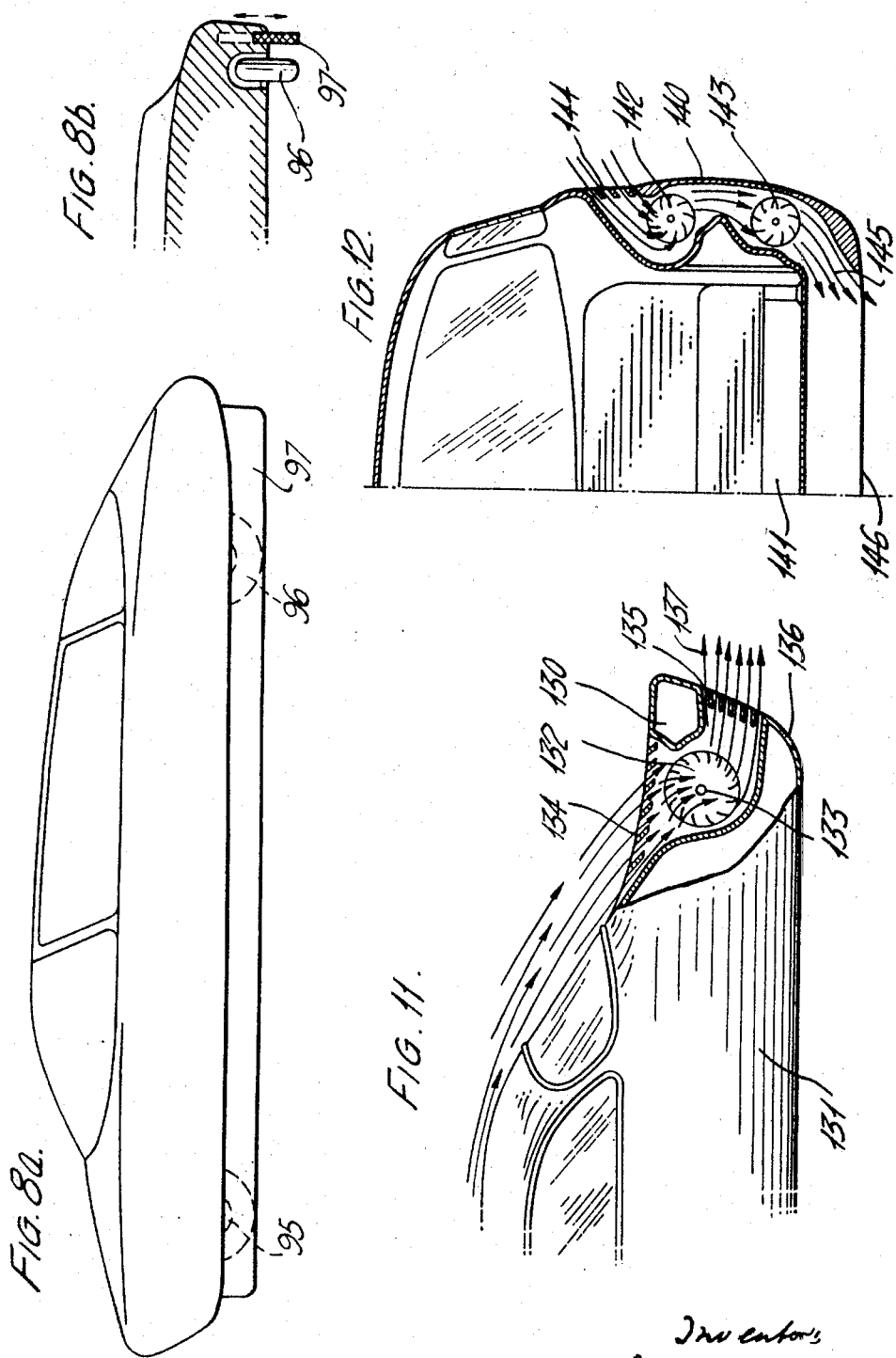

United States Patent Office 3,460,647
Patented Aug. 12, 1969

3,460,647
AIR-CUSHION VEHICLE
Nikolaus Laing, Rosenbergstrasse 24a,
Stuttgart, Germany
Continuation of application Ser. No. 132,756, Aug. 21, 1961. This application Aug. 5, 1966, Ser. No. 571,159
Claims priority, application Germany, Aug. 20, 1960, L 36,868
Int. Cl. B60v 1/00, 1/02
U.S. Cl. 180—120        16 Claims

ABSTRACT OF THE DISCLOSURE

A vehicle for traveling over a support surface while being supported on an air cushion formed between the support surface and the vehicle, wherein the air cushions are produced by at least one pair of blowers rotating in opposite directions and respectively extending along opposite sides of the vehicle and producing a lift-generating flow of air directed generally downwardly and substantially within the projected area of the vehicle. Also included are means to propel and steer the vehicle.

---

The present application is a continuation application of the co-pending application Ser. No. 132,756 filed Aug. 21, 1961 and now abandoned.

This invention relates to air-cushion vehicles. As understood herein the term "air cushion vehicle" means a vehicle carrying one or more blowers adapted to generate a flow of air issuing downwardly from the vehicle so as to form a cushion of air which maintains the vehicle in suspension or at least takes a part of the weight of the vehicle. The vehicle is thus able, supported at least partly on its air cushion, to move over an approximately flat surface such as a road, field, or the sea.

In a previously proposed air-cushion vehicle, a single axial flow blower having a vertical axis is centrally mounted in the upper section of the fuselage, and air discharge ducts extend from said blower within the fuselage, along the upper side and the lateral outer sides of said fuselage, and towards its underside. This known air-cushion vehicle is disadvantageous in several respects. Thus, it will normally be desirable to have the load-carrying part of the vehicle in a central position, particularly in the case of a passenger compartment. However the central disposition of the blower prevents this. The air ducts extending in all directions from the centrally disposed blower occupy the greater part of the volume available within the fuselage. Moreover despite their great cross-section, these air ducts oppose so great a resistance to airflow owing to their relatively excessive lengths, that the overall efficiency of the blower and ducts is poor.

This invention has for its object to provide an improved form of air cushion vehicle which at least to some extent overcomes the disadvantages referred to.

The invention accordingly provides an air cushion vehicle comprising a plurality of cross-flow blowers arranged in the region of opposite outer sides of the vehicle and associated with air intakes and exits said intakes and exits extending substantially horizontally over at least a major part of the length of said sides and, with said blowers, providing for an approximately vertical flow of air between said intakes and the corresponding exits.

The term "cross-flow blower" is understood herein to mean a blower comprising a cylindrical bladed rotor and guide means co-operating therewith to induce a flow of air twice through the blades in a direction transverse to the rotor axis.

A particularly advantageous form of such a blower is described in British Patent No. 876,611, and characterized in that the guide means are wholly outside the rotor and include a guide body co-operating with the rotor to set up a cylindrical vortex eccentric to the rotor axis, the vortex guiding air through the rotor in a curved path: a blower having these characteristics will be termed herein a "tangential flow" blower. An approximate indication of the flow pattern in such a blower is given in FIGURE 6 which is described later.

By virtue of the selection of a suitable type of blower and of the disposition of said blowers and their air ducts along the periphery of the fuselage, the invention renders it possible to produce a large load-carrying space at the centre of the vehicle. Thanks to the disposition of the blowers and ducts along the periphery of the vehicle, the invention renders it possible to utilise very short air ducts and thus to attain an improved overall degree of efficiency of the blowers and air ducts, as compared to that possible in the case of the known air-cushion vehicle mentioned. The invention renders it possible moreover, to utilise a multiplicity of blowers and where appropriate, blower drive units, so that inlividual blowers may be separately controlled, e.g. throttled. Provision is moreover made according to the invention, for driving the air-cushion vehicle forward by means of reactive forces. Blowers which in part also convey air intended to generate the air cushion, may be utilised for this purpose. Separate blowers may however also be utilised to generate the jet of air producing forward motion. Provision is finally made according to the invention, to create a particularly satisfactory form of suspension of the upper part of the vehicle comprising the passenger cabin over the lower chassis-portion of the vehicle mounted on wheels, by the interposition of a supporting air cushion.

The invention will now be further described with reference to the accompanying diagrammatic drawings which illustrate by way of example several embodiments of the invention. In the drawings:

FIGURE 1 is a perspective view of an air-cushion vehicle according to the invention, parts being cut away;

FIGURE 2 is a view similar to FIGURE 1 of another air-cushion vehicle;

FIGURE 3 is a partially sectioned perspective view of a part of a third air-cushion vehicle;

FIGURES 4a, 4b and 4c show parts of a fourth air-cushion vehicle, FIGURE 4a being a partly sectioned perspective view of those parts, and FIGURES 4b and 4c sections respectively on the lines A—A and B—B of FIGURE 4a and FIGURE 4b;

FIGURE 5 is a view similar to FIGURE 4c showing a modification;

FIGURES 6 and 7 are side views, with parts in longitudinal section, of two further forms of air-cushion vehicle;

FIGURES 8a and 8b are a side view and partial transverse section respectively of yet another air-cushion vehicle;

FIGURE 9 is a schematic transverse section of another air-cushion vehicle;

FIGURE 10 is a transverse section of another air-cushion vehicle;

FIGURE 11 is a partially sectioned side view of the rear portion of yet another air-cushion vehicle; and FIGURE 12 is a partial longitudinal section of another air-cushion vehicle.

Referring to the drawings, the vehicle illustrated in FIGURE 1 is designed for passenger transport and within the passenger space comprises two seats 1 and 2. The illustration shows the vehicle cut away at three places, in order to expose the cross-flow blowers generating the air cushion. Two blower rotors 3 and 4 comprising several sections 5, 6, etc., are disposed parallel to the side 7 of the vehicle and with their axes of rotation parallel to each other. These rotors are jointly operated by means of a single driving motor 8, to which in the present instance are coupled additional blowers forming extensions of the rotors 3, 4 disposed on the other side of the motor. The blowers on the other side of the vehicle are mounted in the same way as on the side just described. A blower rotor 9 is visible in the nose of the vehicle, which forms part of a blower assembly whereof the axis of rotation extends parallel to the leading edge of the vehicle. This blower rotor is subdivided into two sections and the driving motor common to the two sections is mounted at 10 between them. Two blower rotors 11 and 12 are visible in the tail of the vehicle, forming part of blowers whereof the axes of rotation extend parallel to each other and parallel to the trailing edge of the vehicle. These blower rotors also comprise two sections, and a driving motor operating both sections is mounted centrally at 13 between said two sections.

The blowers referred to are "tangential-flow" blowers, as previously explained, in passing through the blower the air twice traverses the path of the rotating rotor blades. Intake ducts 14 to 18 are disposed on the upper side of the vehicle in order to draw in air by suction. Corresponding discharge ducts 19, 20a, 20b, 21, 22 are disposed on the underside of the vehicle. In the same manner as the axes of the blowers, these ducts extend parallel to the lateral edges of the vehicle. As apparent within the section cut away at the left-hand front corner of the vehicle, two parallel discharge ducts 20a and 20b separated from each other by a partition 23 leading from the rotors 3, 4 at the sides of the vehicle directly to the discharge opening 20. At its upper extremity, this partition 23 has a guide surface 23a such that a vortex is produced within the rotor 3 on rotation thereof as above described. The body of the vehicle provides an interior wall 24 extending between the intake and discharge openings 18, 20a, 20b, and this wall 24 includes a guide portion 24a adjacent the rotor 4 which cooperates therewith on rotor rotation to set up a vortex in the rotor 4.

On rotation of the rotor 3, air is induced to flow from the suction region 18a directly below the intake opening 18, through the path of the rotating blades 3a of the rotor to be unobstructed interior 3b thereof, and thence again through the path of the rotating blades to the duct 20b which is a pressure region.

Similarly, on rotation of the rotor 4, flow is induced from the suction region 18a through the path of the rotating blades 4a to the unobstructed interior 4b of the rotor and thence again through the path of the rotating blades to the duct 20a which is also a pressure region. From each of the pressure regions air discharges directly through the discharge opening 20 with a main velocity component downwardly directed towards the surface on which the vehicle is to be supported, as shown by the arrows in the ducts 20a and 20b. A stream of air is discharged directly onto the surface so as to get the benefit of the kinetic energy of the air stream, in contrast to previous proposals where it is only possible to make use of the static pressure produced by the fan, the dynamic pressure being lost. The air stream leaving the discharge openings has also a component inwardly of the vehicle so as to confine the air cushion beneath it.

A single blower producing the same output could evidently be fitted instead of the two blowers 3 and 4 mounted to produce parallel flow. Such a single blower would however weigh twice as much per unit of length as the two blowers taken together as may be deduced from the rules governing geometrical progression bearing in mind that the same peripheral velocity is required to attain the same output. An additional and substantial advantage of the invention is thereby made evident. In the case of cross-flow blowers disposed according to the example shown, it is possible without difficulty to spread the delivery volume over several blowers mounted in parallel and to reduce the weight of the blowers in this manner. Based on this reasoning, three blowers mounted in parallel are disposed along the sides in the example of embodiment illustrated in FIGURE 2 and described in the following.

In order to generate thrust, the outlet for the blower 12 in the tail of the vehicle is positioned such that a thrust is generated in the direction of travel. The magnitude of this thrust may be controlled by throttling the throughflow traversing the blower 12 to a greater or lesser degree. A throttling flap 25 is fitted for this purpose, which—operated by a control element (not shown) within reach of the driver's seat—may be moved so as to affect the air issuing from the blower 12 to the extent that thrust is reduced to zero; the speed of travel is controlled in this manner. To allow the vehicle to be steered, throttling mechanisms (not shown) are arranged to reduce the throughput of the blowers on the side towards which the vehicle is to be steered. These throttling mechanisms, which may take the form of flaps, are operated by means of a control element which is not shown and is also fitted within reach of the driver's seat. The aforesaid British Patent No. 876,611 contains a discussion of throttling applied to a "tangential flow" blower.

FIGURE 2 illustrates a second vehicle according to the invention, which is designed for the optional transport of passengers or goods, but preferably the former. In this vehicle, the blowers are disposed in the general manner illustrated in FIGURE 1, with the difference, that instead of two blowers as shown at the tail and sides in FIGURE 1, three blowers are mounted in parallel at those positions in the FIGURE 2 arrangement. The blowers in the front and sides of the vehicle, together with the intake and discharge openings and suction regions therefor, are given the same reference numerals as in FIG. 1, the additional rotor at the side being designated 4a', the construction and operation of these parts will be clear from the foregoing description. Two of the tail blowers, designated 30 and 31, are disposed to generate forward thrust. The forward thrust is controlled by a throttling flap 32 which may optionally be inserted into the discharge duct 33 of the blower 30 and additionally also into the discharge duct 34 of the blower 31, so that both blowers are wholly throttled in the extreme case. In the position illustrated, the throttling flap 32 does not produce any throttling effect on the two blowers 30 and 31, and the maximum thrust is therefore developed. The third blower, designated 35, produces simply vertical thrust.

FIGURE 3 illustrates a further embodiment of the invention; vehicle details which are not shown correspond essentially to those of FIGURE 1 or FIGURE 2. The FIGURE 3 vehicle differs from the latter in that different means are utilised to generate thrust, as will now be described. The rotor disposed at the right-hand side of the vehicle, having regard to the direction of travel, is indicated at 60 in FIGURE 3. This rotor forms part of a "tangential flow" blower having a guide body 61 cooperating with the rotor to produce an eccentric cylindrical vortex. The guide body 61 is pivotally mounted at 62 so that the portion 63 thereof remote from the axis 62 may be moved towards and away from the rotor 60. The character and position of the vortex, and thus the magnitude of the throughflow volume, depends on the position of this guide body 61. The throughflow traversing the blower 60, the size of the air cushion produced and thus the consequent height of travel of the vehicle, may therefore be controlled by pivoting the guide body 61 about the mounting 62 as shown by the double-headed arrow 64. A flow splitter 65 is disposed at the discharge side of the blower; by means of the flow splitter a part of the flow is drawn off from the main discharge duct 65a and directed into a blade grid. This blade grid comprises a row of parallel blades or vanes 66 disposed parallel to each other in such manner as to be pivotable about axes 66a; these blades direct the part of the flow drawn off in a direction opposed to the direction of travel, so that a thrust in the direction of travel is produced by reaction. The magnitude of the thrust depends on the position of the blades 66 which determines the magnitude and direction of the flow therethrough.

The blades 66 and the guide body 61 are each controlled by a control element disposed within reach of the driver. The two corresponding elements are preferably coupled such that thrust may be controlled by means of one lever means 66a, 66b without varying the lift, and that the lift may be controlled by means of another lever means 61a without varying the thrust. The intake duct 67 of the blower is protected against the entry of coarse particles which could damage the blower, by means of a grid comprising a number of rods 68.

A diffeernt disposition serving the same purpose as that shown in FIGURE 3, is illustrated in FIGURES 4a, 4b and 4c. FIGURE 4a shows a detail of an air-cushion vehicle according to the invention, inluding a blower disposed on the right-hand side of the vehicle having regard to the direction of travel. FIGURE 4b shows the same parts in a section taken along the line A—A in FIGURE 4a, and FIGURE 4c shows the same parts in section taken along the line B—B in FIGURE 4b. The cross-flow blower comprising rotor 70 draws air in from above through a grid 71 and discharges it downwardly as shown by the arrows 72. The outer side of the discharge duct is formed by a blade grid 73 comprising a multiplicity of parallel blades 74 whereof the upper extremities are mounted in a longitudinal member 75 which latter simultaneously forms a guide body co-operating with the rotor 70 to produce an eccentric cylindrial vortex. The blades 74 are obliquely positioned such that a certain proportion of the main flow is drawn off according to the arrows 76 to traverse this grid and to be deflected rearwardly thereby— that is to say in the direction opposed to the direction of travel—as shown by the arrows 77. This deflected airflow (arrows 77) generates a thrust which displaces the vehicle in a forward direction. The magnitude of this thrust may be controlled by means such as those described with reference to other embodiments.

FIGURE 5 shows a modified form of the rotor for a blower as used in FIGURES 4a to 4c; FIGURE 5 is a section corresponding to FIGURE 4c. The rotor, which is divided into sections 35 to 38, and mounted in intermediate bearings at 39, 40 and 41, is equipped with helically disposed blades 42. This blade form renders it possible to transmit high torques by means of the blades of the rotor sections 35 to 38, so that fewer driving areas need be provided than for a blower acording to FIGUES 4a to 4c; these driving areas are not shown in FIGURES 4a to 4c and 5.

It should be mentioned that for reasons inter alia of torque transmission it will sometimes be necessary or desirable to provide more than one drive area for each rotor. Each drive area can have its separate motor, or a single moto rcommon to all drive areas of a rotor (or to the drive points of all rotors) can be provided, depending on circumstances.

In a vehicle propelled by thrust generated as emplified in FIGURES 4 and 5, the thrust is generated on both sides. If the thrust is more powerful on one side than on the other a turning moment is imparted to the vehicle about a vertical axis, thereby changing its direction of travel. Means are therefore provided in combination with the thrust-generating means described with reference to FIGURES 4a to 4c and 5, whereby the direction of travel may be changed by varying the thrust on the two sides. This variation is appropriately performed by coupling the adjusting means for both sides in such manner that the direction of travel may be changed without thereby varying the forward thrust component; in other words, a compensatory system is automatically brought into action for the forward thrust when the direction of travel is varied. A coupling system may to this end be so disposed, for example, that when the vehicle is to be steered towards the left, the thrust on the left-hand side is reduced and that on the right-hand side increased in such proportion that the total forward thrust remains constant, and that an additional turning moment is exerted towards the left. In order to stabilise the vehicle, coupling systems may moreover be disposed such that the lift on the lefthand or right-hand side is controlled so as to raise the outer side of the vehicle, thereby banking the vehicle in a turn.

A central blower such as shown in the vehicle illustrated in FIGURE 6 may moreover be fitted to generate the forward thrust, either conjointly with the means already described or instead of these, said central blower being mounted at an acute angle to the surface over which the vehicle is to travel, e.g. a road as shown at 80 in FIGURE 6. The vehicle 81, which may apart from the central blower be constructed as illustrated in FIGURE 1, hovers over this surface 80. The central blower is designated generally 82 and comprises 6 rotor sections driven by means of a central motor 83. The rotor is mounted in bearings at the intermediate points 84 to 89 and at the extremity 90. The blower is a cross-flow or "tangential flow" blower (such as has already been described) and its discharge orifice points downwards. Disposed in said discharge orifice or in a duct leading thereto is a blade grid 91 whereof the blades are disposed obliquely to the direction of discharge and rearwardly curved in such manner that the emergent air is deflected in the direction opposed to the direction of travel as shown by the arrows 92; a thrust is thereby exerted on the vehicle in the direction of travel. The magnitude of this thrust is controlled as in the other embodiments, possibly in combination with mechanims controlling lift and change in direction of travel. Blowers such as designated 11, 12 in FIGURE 1 may be retained to provide supplementary lift and forward thrust, or may be dispensed with.

Considerable volumes of air are set in motion by aircushion vehicles, and it is difficult to render these harmless in town traffic. An air-cushion vehicle for town use is shown in FIGURE 7 and comprises retractable wheels 93 and 94 at the four corners, said wheels wholly or partly carrying the vehicle in town traffic, that is to say assisting the lift produced by the air cushion. Three wheels may be fitted instead of four wheels. Apart from the wheels the vehicle may be as described with reference to any of the previous figures.

The vehicles illustrated in FIGURES 8a and 8b is constructed in precisely the same manner as that of FIGURE 7 except that the wheels here designated 95 and 96 are fitted behind a longitudinal rubber fin 97 which may be retracted into the vehicle (as apparent from the section shown in FIGURE 8b), when the wheels come into contact with the ground.

It is difficult to maintain direction of travel with an aircushion vehicle, since a light gust of wind or any other external force exerted on the vehicle does not encounter any resistance. For this purpose, these wheels need support no more than slight loads and need not be robustly constructed, since the greater part of the lift is produced by the air cushion. A single wheel is also adequate to this end, which may for example be centrally mounted beneath the vehicle abreast of the position shown in FIGURE 7 for the wheel 93.

FIGURE 9 is a cross-section through an arrangement wherein a resilient suspension device (not illustrated) is disposed at 99a between the running gear 99b and the unit accommodating the payload and indicated at 99c. The unit 99c is mainly supported by means of a system generating an air cushion such as described in the preceding and the following examples, whereas the resilient suspension devices at 99a take only a very small part of weight.

FIGURE 10 shows a vehicle wherein an air cushion supporting the upper section 102 of the vehicle is generated between the lower section 100 of the vehicle equipped with wheels 101 and driving means (not shown), and the upper section 102 of the vehicle containing the passenger cabin. The air cushion is generated by means of crossflow blowers comprising rotors 103 and guide bodies 104 co-operating therewith to produce eccentric cylindrical vortices, the rotors and guide bodies extending parallel to the sides 105 of the lower part 100 of the vehicle. The blowers produce airflows in zones 106 of the rotors 103 in the direction of the arrows 107 and 108. That part of the air flow from the rotor 103 which follows the direction of the arrow 107 forms the supporting air cushion. It flows around the guide body 104 and strikes a lateral projection 109 of the upper section 102 of the vehicle upon which it produces lift, and thereupon flows into the rotor 103 again at the upper side thereof together with a minor quantity of fresh air which follows the direction of arrow 110. The flows following the arrows 108 flow between a tub-shaped upper side 111 of the lower part 100 of the vehicle and a matching underside 112 of the upper part 102 of the vehicle, to an air discharge vent 113 extending along the longitudinal axis of the vehicle in the lower part 100 of the latter. The partial flows following the direction of the arrows 108 exert a stabilising action on the orientation of the upper part of the vehicle relative to the lower part. If the upper part of the vehicle is pushed towards the right for example, the static pressure of the partial flow between the upper and lower parts of the vehicle is simultaneously increased on this side as a result of the reduction in cross-section caused by the displacement, the upper part of the vehicle thereby being returned into its intended position. This stabilising action occurs not only for a lateral displacement but also when the upper part of the vehicle is twisted relative to the lower part.

FIGURE 11 shows a partially sectioned side view of a portion of another vehicle according to the invention. A cross-flow blower 132 whereof the rotor axis 133 extends transversely to the direction of travel is disposed in the tail 130 of the air-cushion vehicle 131. Air enters the cross-flow blower 132 through intake orifices 134 in the top of the tail 130. The air drawn in emerges from the cross-flow blower through discharge orifices 135 in the rear side 136 of the tail 130 of the vehicle and thereby produces a thrust on the air-cushion vehicle 131 which is oppositely directed to the arrows 137. As will be appreciated, FIG. 11 should be regarded as showing a variant of the FIG. 1 construction, and the means for formation of the air cushion and FIG. 11 will be the same as that of FIG. 1

FIGURE 12 shows a cross-section of part of yet another vehicle according to the invention. Two cross-flow blowers 142 and 143 arranged in cascade are disposed one above the other behind a lateral outer side 140 of an air-cushion vehicle 141. The air entering through intake orifices 144 in the upper area of the side 140 is conveyed by the cross-flow blower 142 to the cross-flow blower 143, which discharges the air through a discharge duct 145 on the underside 146 of the air-cushion vehicle 141.

I claim:
1. A vehicle for traveling over a support surface while supported on an air cushion formed between the support surface and the vehicle, said vehicle comprising a body; at least a pair of similar blowers rotating in opposite directions and mounted on the body one at either side thereof and producing a lift-generating flow of air directed generally downwardly within the projected area of the body, each of said blowers comprising at least one cylindrical rotor mounted for rotation about its axis and having a series of blades extending generally longitudinally of the axis and arranged in a ring thereabout to define an unobstructed interior space, and guide means extending substantially the length of the rotor, defining therewith a suction and a pressure region, and guiding air to pass from the suction region through the path of the rotating blades to the interior space and thence again through the path of the rotating blades to the pressure region; air intake ducts at either side of the vehicle in substantial alignment with the rotor, each suction region receiving air from the respective intake ducts; discharge ducts in substantial alignment with and below the respective rotors and each discharging air from the respective pressure region, said intake and discharge ducts extending longitudinally of the vehicle; and means to provide controllable thrust in a fore and aft direction of the vehicle.

2. A vehicle as claimed in claim 1, and including means to vary the momentum of the air streams passing through at least two of said regions.

3. A vehicle as claimed in claim 2, wherein said means to vary the momentum of the air streams are constructed to vary the momentum of the air stream on one side with respect to that at the other side to effect steering of the vehicle, and wherein each blower with its respective intake and discharge ducts extends longitudinally of the vehicle over the greater part of the length thereof.

4. A vehicle as claimed in claim 3, wherein the means to vary the momentum of the air stream comprise differential throttle means for the rotor at either side of the vehicle.

5. A vehicle as claimed in claim 4, wherein said controllable thrust means comprises a blower and associated intake and discharge ducts similar to those at the sides of the vehicle are situated at the front of the vehicle for discharge of air downwardly and inwardly of the vehicle onto the support surface.

6. A vehicle as claimed in claim 2, wherein said means to vary the momentum of the air streams comprise throttle means for said blower at either side of the vehicle and including a movable wall element adjacent to the respective rotor.

7. A vehicle as claimed in claim 1, wherein each blower comprises a plurality of coaxial rotors arranged longitudinally of the vehicle and extending over the greater part of the length thereof.

8. A vehicle as claimed in claim 1, said at least a pair of blowers includes two blowers mounted parallel to one another at each said side of the vehicle and operating in parallel.

9. A vehicle as claimed in claim 1, wherein said means for providing controllable thrust comprise a secondary blower mounted transversely of the vehicle producing a thrust-generating flow of air having a conponent to propel the vehicle in either of said directions, said secondary blower comprising a cylindrical rotor mounted for rotation about its axis and having a series of blades extending generally longitudinally of the axis and arranged in a ring thereabout to define an unobstructed interior space, and guide means extending the length of the rotor, defining therewith a suction and a pressure region, and guiding air to pass from the suction region through the path of the rotating blades to the interior space and thence again through the path of the rotating blades to the pressure region; and means to vary the thrust generated by said secondary blower.

10. A vehicle as claimed in claim 1, wherein said forward thrust-generating means comprises a secondary blower mounted longitudinally of the vehicle and extending from a front portion of the vehicle upwardly inclined toward the rear at an acute angle to the support surface, said secondary blower comprising a cylindrical rotor mounted for rotation about its axis and having a series of blades extending generally longitudinally of the axis and arranged in a ring thereabout to define an unobstructed interior space, and guide means extending the length of the rotor, defining therewith a suction and a pressure region, and guiding air to pass from the suction region through the path of the rotating blades to the interior space and thence again through the path of the rotating blades to the pressure region.

11. A vehicle as claimed in claim 1, wherein said rotors extend at least over the major part of the length of the corresponding sides and wherein the rotors of the blowers are axially subdivided into several sections and are mounted in bearings disposed between said sections.

12. A vehicle as claimed in claim 1, wherein the rotors of the blowers are axially subdivided into several sections and are mounted in bearings disposed between said sections, and wherein means are provided to drive each rotor at a plurality of points intermediate said sections.

13. A vehicle as claimed in claim 1, wherein the rotors of the blowers are axially subdivided into several sections and are mounted in bearings disposed between said sections, and wherein a separate power source is provided for each of a plurality of driving points for each rotor.

14. A vehicle as claimed in claim 1, wherein on at least a pair of opposite sides of the vehicle a plurality of blowers is disposed side by side with the rotor axes parallel to each other.

15. A vehicle as claimed in claim 1, further comprising deflection means along the length of each discharge duct to deflect a minor portion of the air flow therein towards the rear to provide forward thrust for the vehicle.

16. A vehicle as claimed in claim 1, further comprising deflection means along the length of each discharge duct to deflect a minor proportion of the air flow toward the rear to provide forward thrust for the vehicle, said deflection means including a flow splitting member extending the length of each rotor part-way across the arc of air exit therefrom, the flow splitting member dividing the air flow from the rotor into a major portion discharged through the corresponding discharge duct and a minor portion, said deflection means further including a series of deflector elements extending in spaced parallel relation generally transversely of the vehicle in the path of said minor air flow portion and deflecting said portion rearwardly.

References Cited

UNITED STATES PATENTS

| | | |
|---|---|---|
| 3,033,441 | 5/1962 | Coester. |
| 3,305,164 | 2/1967 | Laing. |
| 3,363,716 | 1/1968 | Cockerell _____ 180—129 X |

A. HARRY LEVY, Primary Examiner

U.S. Cl. X.R.

180—119, 129; 230—125